(12) United States Patent
Chenier et al.

(10) Patent No.: US 10,582,049 B2
(45) Date of Patent: Mar. 3, 2020

(54) LOCATION SPECIFIC DISPATCH RESOLUTION SYSTEM

(71) Applicant: ProntoForms Inc., Ottawa (CA)

(72) Inventors: Glenn Michael Chenier, Kanata (CA); James Jeremy Goodfellow, Kanata (CA)

(73) Assignee: ProntoForms Inc., Ottawa (CA)

(*) Notice: Subject to any disclaimer, the term of this patent is extended or adjusted under 35 U.S.C. 154(b) by 0 days.

(21) Appl. No.: 15/896,682

(22) Filed: Feb. 14, 2018

(65) Prior Publication Data

US 2018/0241877 A1   Aug. 23, 2018

Related U.S. Application Data

(60) Provisional application No. 62/460,478, filed on Feb. 17, 2017.

(51) Int. Cl.
| | |
|---|---|
| H04M 3/42 | (2006.01) |
| G06Q 10/10 | (2012.01) |
| H04M 3/50 | (2006.01) |
| G06Q 30/00 | (2012.01) |

(52) U.S. Cl.
CPC ........ *H04M 3/42348* (2013.01); *G06Q 10/10* (2013.01); *G06Q 30/01* (2013.01); *H04M 3/50* (2013.01)

(58) Field of Classification Search
CPC ...... H04M 3/42; H04M 3/42348; H04M 3/50; H04M 3/51
See application file for complete search history.

(56) References Cited

U.S. PATENT DOCUMENTS

| | | | | |
|---|---|---|---|---|
| 9,438,735 B2* | 9/2016 | Tietsch | ............... | H04M 3/5232 |
| 10,459,951 B2* | 10/2019 | Venkataraman | ............................ | |
| | | | | G06F 16/24578 |
| 2006/0126801 A1* | 6/2006 | Laperi | .................... | G06Q 10/06 |
| | | | | 379/32.01 |
| 2006/0233312 A1* | 10/2006 | Adams, Jr. | ........... | H04Q 3/0075 |
| | | | | 379/21 |
| 2007/0116185 A1* | 5/2007 | Savoor | ................ | H04M 3/5191 |
| | | | | 379/9 |
| 2008/0198974 A1* | 8/2008 | Lewis | .................... | G06Q 30/02 |
| | | | | 379/32.04 |
| 2013/0095807 A1* | 4/2013 | Bhaumik | .............. | H04W 4/023 |
| | | | | 455/417 |

* cited by examiner

*Primary Examiner* — Blane J Jackson
(74) *Attorney, Agent, or Firm* — Stratford Managers Corporation

(57) ABSTRACT

A central dispatch system for transmitting a service call from a consumer to a service provider includes a central resolution system coupled to a plurality of location specific resolution systems. Each of the location specific resolution systems is coupled with a location specific forms database. The central dispatch system creates a query to the central resolution system comprising a location of the service call and one or more tags to the central resolution system submits the query to one of the plurality of location specific resolution system based on the location of the service call. The local resolution system prepares a service request for one of the service providers comprising one or more forms selected based on the tags. The forms may be pre-filled with information provided by the consumer to the central dispatch system.

2 Claims, 1 Drawing Sheet

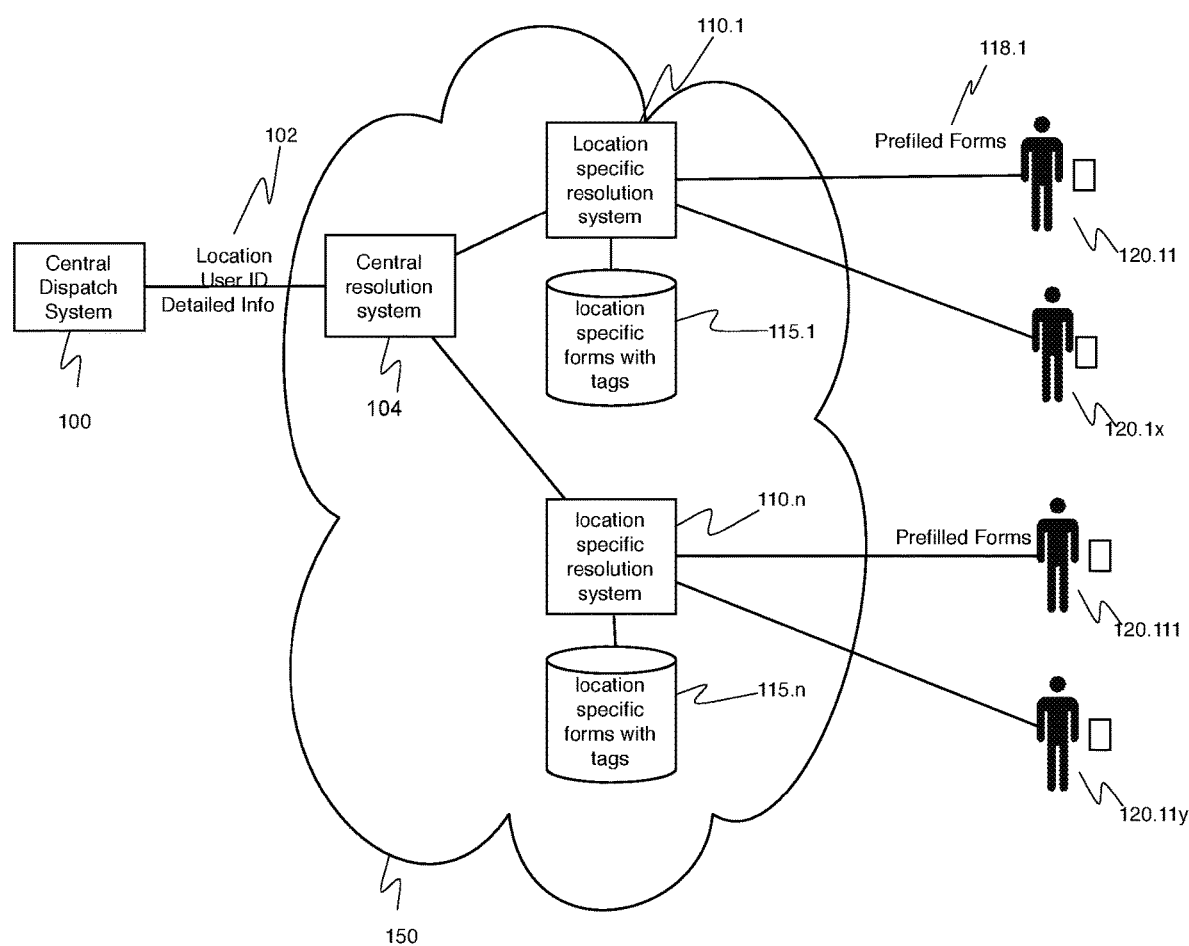

LOCATION SPECIFIC DISPATCH RESOLUTION SYSTEM

CROSS-REFERENCE TO RELATED APPLICATIONS

This application claims the benefit of U.S. Provisional Patent Application Ser. No. 62/460,478, filed Feb. 17, 2017, which is incorporated herein by reference in its entirety.

FIELD OF THE INVENTION

The present disclosure relates to dispatch systems.

BRIEF DESCRIPTION OF THE DRAWINGS

The foregoing and other advantages of the disclosure will become apparent upon reading the following detailed description and upon reference to the drawings.

FIG. 1 is an example of a location specific resolution system.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Central dispatch systems are used to dispatch service calls, for example a car towing request, a HVAC inspection etc. Consumers call into a central call center to place their request for service, they provide identification and information regarding the service they need.

Current central dispatch systems use a resolution mechanism to dispatch the service request along with the necessary information to the appropriate service provider that provides the service. The system may also provide to the service provider one or more electronic form to be filled during the service call. The electronic forms can be filled on a smart phone, computer or tablet.

There is a need for a central dispatch system that can dispatch forms that are customized to specific requirements based on the location where the service is performed. For example, in a car towing dispatch system, different consent forms are required to be filled based on the state or province or country where the service is delivered. The forms used at each locations for different types of services calls need to be managed by each locations.

Referring to FIG. 1, in one embodiment, when the central dispatch system 100 receives a service request from a consumer 101, it generates a query to a central resolution system 104. The query includes the location of the service call, the identification of the consumer, one or more service tags identifying the services required. The central resolution system, resolves the query and transfers the query to a location specific resolution system 110.1 ... 110.$n$, based on the location of the service call.

The location specific resolution system 110.1 ... 110.$n$ accesses a database of forms which are configured with one or more service tags. When the location specific resolution system 110.1 ... 110.$n$ receives a query, the system indexes the database with the tags comprised in the query to extract the forms that should be sent to the service provider 120.11 ... 120.1$x$ ... 120.$n1$ ... 120.$ny$. The system pre-fills the forms with the location of the service call, the identification of the consumer and the services required before dispatching a service request to the service provider 120.11 ... 120.1$x$ ... 120.$n1$ ... 120.$ny$.

The central resolution system can be configured and managed via a separate system 150. The location specific resolution systems 110.1 ... 110.$n$ can be configured and managed via location specific management systems 160.1 ... 160.$n$.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system for transmitting a service call from a consumer to a service provider comprising:
   a central resolution system coupled to a plurality of location specific resolution systems;
   each of said location specific resolution systems coupled with a location specific forms database;
   a central dispatch system operable to create a query to said central resolution system comprising a location of said service call and a plurality of tags to said central resolution system, wherein said central resolution system is operable to submit said query to one of said plurality of location specific resolution systems based on said location of said service call; and
   each of said location specific resolution systems operable to prepare a service request for said service provider comprising one or more forms selected based on said plurality of tags,
wherein each location specific forms database contains one or more specific tags of said plurality of tags.

2. The system of claim 1 wherein said forms are pre-filled with information provided by said consumer to said central dispatch system.

* * * * *